United States Patent [19]

Sakamoto et al.

[11] Patent Number: 4,660,108
[45] Date of Patent: Apr. 21, 1987

[54] AUTOMATIC TRACKING APPARATUS

[75] Inventors: Hitoshi Sakamoto; Takayuki Okafuji, both of Kanagawa, Japan

[73] Assignee: Sony Corporation, Tokyo, Japan

[21] Appl. No.: 779,846

[22] Filed: Sep. 25, 1985

[30] Foreign Application Priority Data

Sep. 28, 1984 [JP] Japan .............................. 59-203385

[51] Int. Cl.⁴ .......................... G11B 5/58; H04N 5/78
[52] U.S. Cl. ...................................... 360/77; 360/10.2
[58] Field of Search .......................... 360/10.2, 75–78; 358/312, 335; 369/32, 43

[56] References Cited

U.S. PATENT DOCUMENTS

| 4,418,366 | 11/1983 | Moriya | 360/10.2 |
| 4,471,392 | 9/1984 | Zorbalas | 360/10.2 X |
| 4,549,235 | 10/1985 | Sakamoto | 360/10.2 |

FOREIGN PATENT DOCUMENTS 56-03426  1/1981  Japan .................................. 360/10.2

Primary Examiner—Aristotelis M. Psitos
Attorney, Agent, or Firm—Lewis H. Eslinger; Alvin Sinderbrand

[57] ABSTRACT

An automatic tracking apparatus for use in a video tape recorder including a magnetic head mounted on a piezo-electric element. The automatic tracking apparatus includes a driving pulse generator which generates a driving pulse signal causing the piezo-electric element to drive the magnetic head. The driving pulse signal has a waveform including a jumping portion causing the magnetic head to jump from one recording track to another recording track, which generates ringing vibrations in the piezo-electric element in a change-speed reproduction mode. An inflection point is imposed on the jumping portion of the driving pulse signal waveform. The position of the inflection point is determined in accordance with the amplitude level of the ringing vibrations so as to minimize the amplitude level of the ringing vibrations.

12 Claims, 8 Drawing Figures

AUTOMATIC TRACKING APPARATUS

BACKGROUND OF THE INVENTION

1. Field of the Invention

This invention relates to an automatic tracking apparatus for use in a video tape recorder (VTR) including a magnetic head mounted on a piezo-electric element and, more particularly, to an automatic tracking apparatus including a driving pulse generator for generating a driving pulse signal to deflect the piezo-electric element so as to drive the magnetic head.

2. Description of the Prior Art

In video tape recorders (VTR) using a rotary magnetic head mounted on a piezo-electric element, such as a bimorph element, an automatic tracking apparatus generates a driving pulse signal at a predetermined frequency to deflect the piezo-electric element so as to drive the magnetic head in reproducing a video signal. The reproduced video signal is applied to an envelope detector circuit which generates an envelope signal corresponding to the envelope of the reproduced video signal. The automatic tracking apparatus controls the deflection of the piezo-electric element based upon the envelope signal so as to cause the magnetic head to accurately follow a desired recording track in a changed-speed reproduction mode. Such a conventional automatic tracking apparatus is disclosed, for example, in Japanese Patent Publication No. 58-27866.

In such conventional automatic tracking apparatus, when the magnetic head jumps from one recording track to another recording track, the piezo-electric element is subjected to its maximum deflection and thus maximum mechanical vibrations (referred hereinafter to as ringing vibrations), causing tracking error. It is necessary to suppress ringing vibrations as much as possible.

In order to suppress the ringing vibrations which occur when the magnetic head jumps, an attempt has been made to provide an inflection point in the waveform of the driving pulse signal to the piezo-electric element during the magnetic head jumping period so that the driving pulse signal increases at a smaller rate in the latter stage of the magnetic head jumping period, thereby suppressing the ringing vibrations, as disclosed, for example, in Japanese Patent Application Nos. 59-13910 and 59-13911, assigned to the assignee of the present invention.

Such an automatic tracking apparatus is satisfactory for general application, but it has been found that its usefulness is limited in specialized applications, particularly where the magnetic head jumps over two or three recording tracks to a demanded recording track in a changed-speed reproduction mode. During this operation, the piezo-electric element is subject to much greater deflection and thus much greater ringing vibrations. Both accurate tracking control and suppression of ringing vibrations below a desired level cannot be expected without setting the inflection point with much greater accuracy. In addition, the characteristics of the piezo-electric element change with time and environmental conditions, causing deviation of the inflection point from the desired position. It is impossible for a user to readjust the inflection point to the desired position.

In order to eliminate the problems associated with conventional tracking apparatus, the present invention provides an improved automatic tracking apparatus which can provide superior tracking servo control ensuring that the inflection point is automatically adjusted to an optimum position in the waveform of a driving pulse signal sent to the piezo-electric element.

SUMMARY OF THE INVENTION

There is provided, in accordance with the present invention, an automatic tracking apparatus for use in a video tape recorder including a magnetic head mounted on a piezo-electric element. The automatic tracking apparatus includes a driving pulse generator for outputting a driving pulse signal to the piezo-electric element to deflect the piezo-electric element and thus drive the magnetic head. The driving pulse signal has a waveform including a jumping portion causing the magnetic head to jump from one recording track to another recording track which often induces ringing vibrations in the piezo-electric element in a changed-speed reproduction mode.

The present invention is characterized by means for providing an inflection point in the jumping portion of the driving pulse signal waveform, means for detecting the amplitude level of the ringing vibrations in the piezo-electric element during the period of jumping of the magnetic head, and means for determining the projected optimum position of the inflection point along the waveform in accordance with the detected amplitude level of the ringing vibrations.

BRIEF DESCRIPTION OF THE DRAWINGS

The present invention will be described in greater detail by reference to the following description taken in connection with the accompanying drawings, in which.

DETAILED DESCRIPTION OF THE PREFERRED EMBODIMENT

Figure 1:
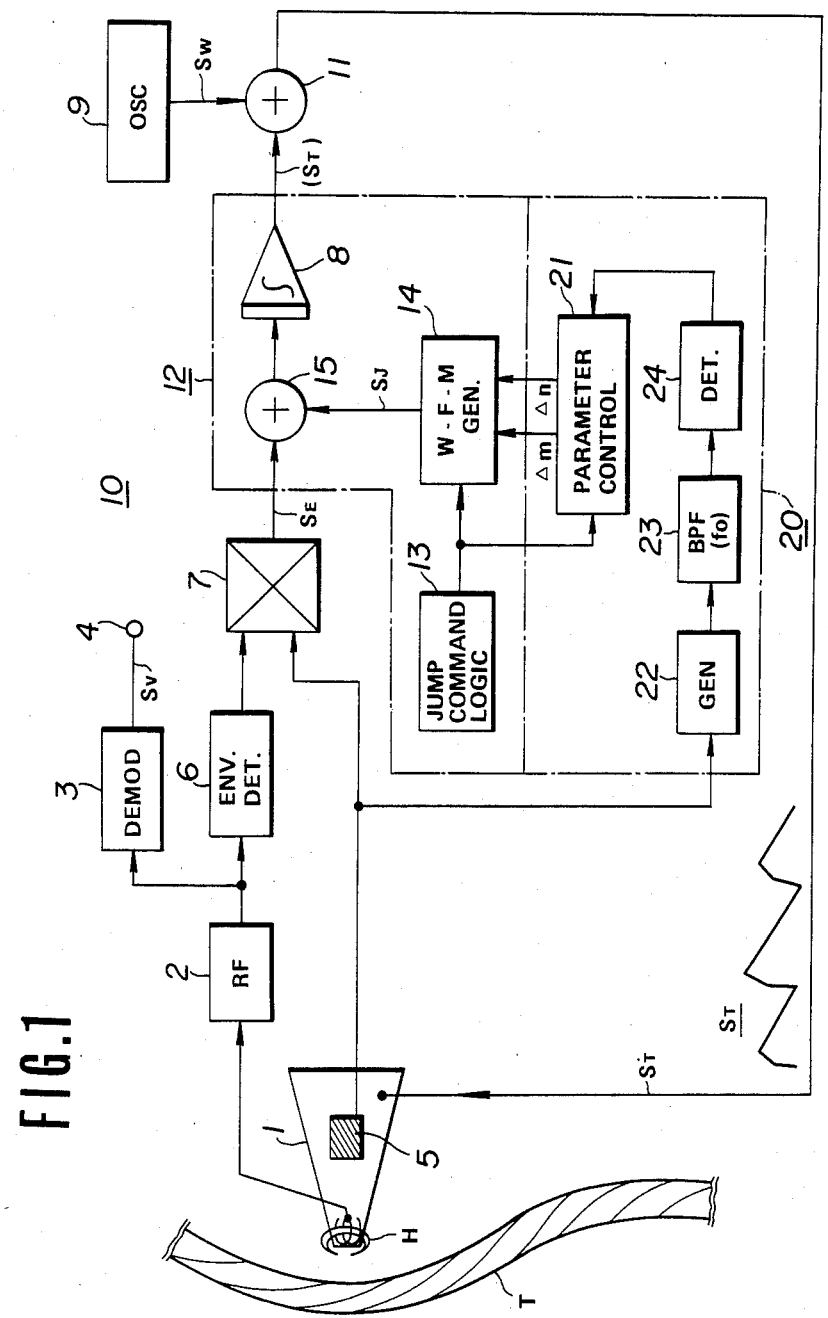
FIG. 1 is a block diagram showing one embodiment of an automatic tracking apparatus made in accordance with the present invention.

FIG. 1 shows one embodiment of an automatic tracking apparatus built in accordance with the principles of the present invention. The automatic tracking apparatus, which is designated generally as 10, is shown as including a driving pulse generating circuit 12 and a control circuit 20. The automatic tracking apparatus generates a driving pulse signal ST to a piezo-electric element 1 at one end of which a magnetic head H is secured. A strain detector element 5 is affixed on the piezo-electric element 1.

The piezo-electric element 1 drives the magnetic head H in response to the driving pulse signal so that the magnetic head H can trace a desired track recorded on a tape T to produce a frequency modulated video signal. The frequency modulated video signal is applied through a high frequency amplifier circuit 2 to a demodulator circuit 3 which converts it into an amplitude modulated video signal. The amplitude modulated video signal SV appears at an output terminal 4. The output of the high-frequency amplifier circuit 2 is also coupled to an envelope detector circuit 6 which generates an envelope signal corresponding to the envelope of the frequency modulated video signal. The envelope signal is applied to a multiplier circuit 7 which may include a balanced demodulator circuit.

The train detector element 5 generates a deflection signal proportional to the deflection of the piezo-electric element 1. The deflection signal is applied to the multiplier circuit 17. The multiplier circuit 7, which receives the envelope signal and the deflection signal, generates an error signal SE corresponding to a tracking error. The error signal SE is integrated in an integrating circuit 8. The integrated signal is applied to an adder 11 which adds it to a wobbling signal SW generated by a sine wave generator 9 to produce a driving pulse signal ST. The wobbling signal has a predetermined frequency (1.4 KHz in this embodiment).

Therefore, in a normal reproduction mode, the deflection of the piezo-electric element 1 is controlled as a function of the tracking error signal SE only so that it just tracks the magnetic head H.

In a changed-speed reproduction mode where a change is ordered in the drive speed of the tape T, it is necessary to control the tracking deflection of the magnetic head H in such a manner that the magnetic head H can follow the ordered speed change. When the magnetic head H shifts from one recording track to a desired recording track, the distance of the magnetic head H is to jump depends on the ordered speed change.

Figure 2:
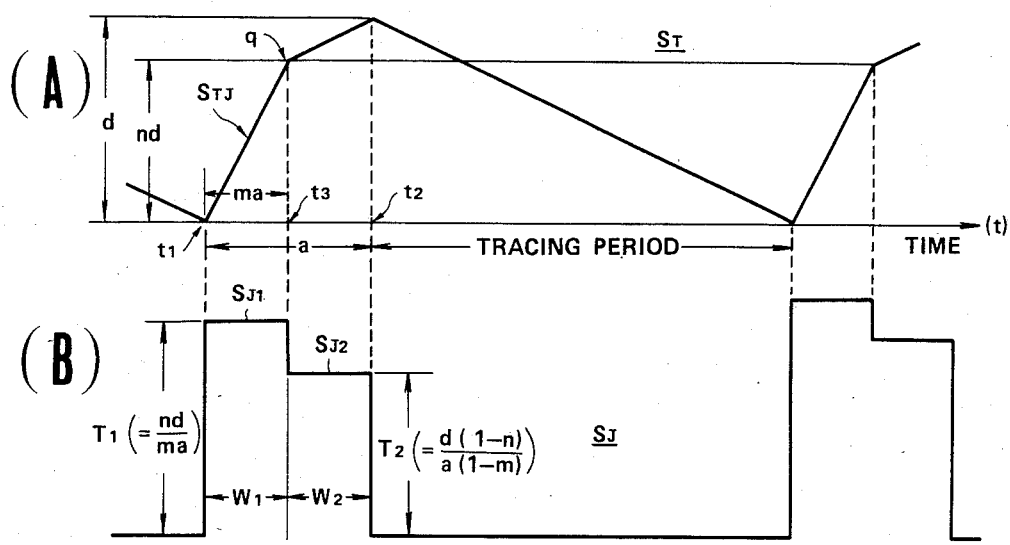
FIG. 2 shows two exemplary waveforms A and B used in generating the driving pulse signal.

In order to satisfy this requirement, the automatic tracking apparatus 10 includes a driving pulse signal generating circuit 12 which generates a driving pulse signal ST indicative of the jump path of the magnetic head H in accordance with the ordered speed change. The driving pulse generating circuit 12 includes a jump command logic circuit 13 which generates a command signal indicative of the desired speed change. The command signal is applied to a rectangular wave generator 14 which generates a rectangular wave signal SJ, as shown in FIG. 2B. The rectangular wave signal SJ is applied to an adder 15 where it is combined with the error signal SE. The output of the adder 15 is coupled to the integrating circuit 8 which produces a driving pulse signal ST, as shown in FIG. 2A.

The driving pulse signal ST, which is the result of integration of the rectangular wave signal SJ, has a jump signal STJ with an inflection point q at a time t3, as shown in FIG. 2A. The position of the inflection point q is expressed as (ma, nd) where a is the jumping or flyback time period, d is the level of the jump signal STJ, m is a variable related to time, and n is a variable related to the level of the jump signal STJ. The variables m and n are fractional factors determined by the control circuit 20 which will be described later in detail.

As can be seen from a comparison of FIGS. 2A and 2B, the position ma of the inflection point q on the time axis is determined by the pulse width W1 of the early portion SJ1 of the rectangular wave signal SJ. The inclination nd/ma of the jump signal STJ between times T1 and T3 is determined by the amplitude level T1 of the early portion SJ1 of the rectangular wave signal SJ. Similarly, the inclination $d(1-n)/a(1-m)$ of the jump signal STJ between times t3 and t2 is determined by the amplitude level T2 of the subsequent portion SJ2 of the rectangular wave signal SJ. It is possible, therefore, to change the position of the inflection point q by changing the variables m and n, that is, the pulse widths W1 and W2 and the amplitude levels T1 and T2 of the early and subsequent portions SJ1 and SJ2 of the rectangular wave signal SJ, respectively. The parameters nd and ma, which are used in determining the position of the inflection point q, are dependent upon the characteristics of the piezo-electric element 1. Specifically, the parameter nd changes with the damping coefficient of the piezo-electric element 1, whereas the parameter ma changes with the natural frequency of the piezo-electric element 1.

Figure 3:
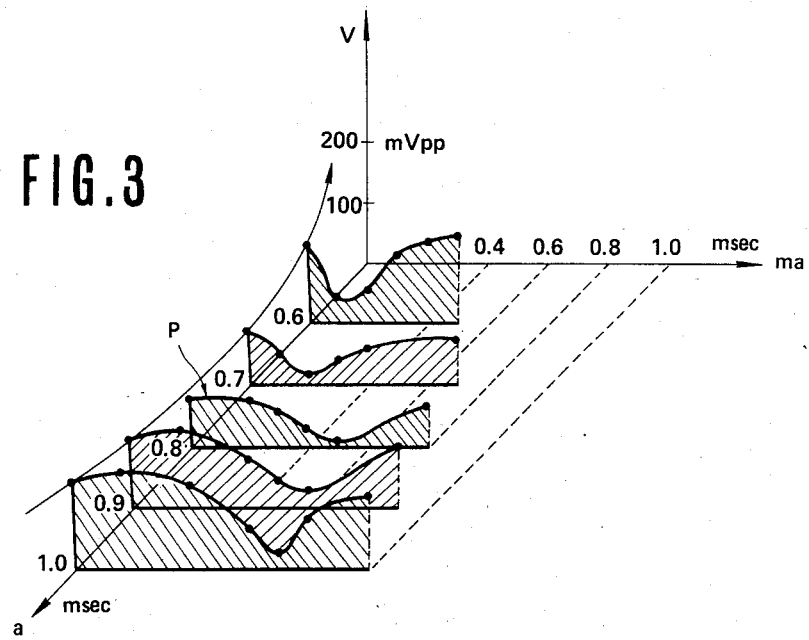
FIG. 3 is a graph showing the results of tests made on the piezo-electric element.

FIG. 3 shows the results of tests made on the piezo-electric element 1 used in this embodiment of the present invention. The amplitude level V of the ringing frequency component, which corresponds to the ringing vibrations produced on the piezo-electric element 1, changes with the jumping or flyback period a and the time parameter ma. The amplitude level V of the ringing frequency component is at its minimum level when $a=0.8$ m.sec. and $ma=0.5$ m.sec., as shown by the curve P of FIG. 3. Thus, in this case the flyback period a is set at 0.8 m.sec., and the parameter ma is set at 0.5 m.sec., so that the initial value m0 of the time-related factor m is set to about $\frac{5}{8}$. A constant $\Delta m$ is added to the current time-related factor value m to provide a new time-related factor value m each time the magnetic head H jumps. The constant $\Delta m$ is set to a fraction of the time-related factor m. The constant $\Delta m$ to be added to the time-related factor m has a positive polarity when the difference $\Delta V$ between the amplitude levels of the ringing frequency components produced by two successive magnetic head jumps is negative and has a negative polarity when the difference is positive. The value of the amplitude-related factor n is set by a similar process. Specifically, the initial value n0 of the amplitude-related factor n is determined from test results in a manner similar to that described in connection with the time-related factor m and a constant $\Delta n$ is added to the current amplitude-related factor value n each time the magnetic head H jumps, as described in connection with the time-related factor m.

The control circuit 20 calculates the initial values m0 and n0 and the constants $\Delta m$ and $\Delta n$ based upon the ringing frequency component detected by the strain detector element 5. For this purpose, the control circuit 20 includes a gate circuit 22 which receives an input from the strain detector element 5 and passes the strain detector circuit output during a jumping or flyback time period a. The output of the gate circuit 22 is coupled to a band-pass filter circuit 3. The frequency of the mid-range band of the band-pass filter circuit 3 corresponds to the ringing frequency f0 so that the ringing frequency component centered about the pass frequency f0 is applied to a peak or average value detector circuit 24 which detects the amplitude level of the ringing frequency component. The detected signal is applied to a parameter control circuit 21 which then determines the values of parameters m0 and n0 and the values and polarities of the constants $\Delta m$ and $\Delta n$. If the difference $\Delta V$ between the detector circuit output amplitude level for the first changed-speed reproduction mode (i=0) and the detector circuit output amplitude level for the next tracking operation, obtained by adding the constant $\Delta m$ of predetermined polarity to the last amplitude level, is negative, the constant $J\Delta m$ of the same polarity as the constant $\Delta m$ is added to the difference value $\Delta V$. If the difference $\Delta V$ is positive, the constant $J\Delta m$ of polarity opposite to the predetermined polarity is added to it. The time- and amplitude-related factors m and n are set alternatingly. That is, the time-related factor m is set when i=1, 3, 5, ..., whereas the amplitude-related factor n is set when i=2, 4, 6, ... Consequently, the time-related factor m is set (1) $m=m0+2\Delta m$ when $\Delta m>0$, $\Delta V(i=1)<0$, and $\Delta V(i=3)<0$, (2) $m=m0$ when $\Delta M>0$, $\Delta V(i=1)>0$, and $\Delta V(i=3)<0$, (3) $m=m0-2\Delta m$ when $\Delta m<0$, $\Delta V(i=1)<0$, and $\Delta V(i=3)<0$, or (4) $m=m0$ when $\Delta m<0$, $\Delta V(i=1)>0$, and $\Delta V(i=3)<0$.

Similarly, the amplitude-related factor n is set in accordance with the polarity of the amplitude level difference $\Delta V$. It is, therefore, apparent that to use feedback control to constrain the inflection point q to the position at which the ringing frequency component produced during jumping is minimized, the time- and amplitude-related factors m and n may be determined in accordance with the polarity of the amplitude level difference $\Delta V$.

The characteristics of the piezo-electric element 1 change with time and environmental conditions, which has a direct influence on the detected amplitude level of the ringing frequency component and thus the factors m and n. Consequently, if the factors m and n are determined in accordance with the polarity of the amplitude level difference $\Delta V$, the inflection point can be constrained to the position at which the ringing frequency component produced during a jumping time period is minimized even if the characteristics of the piezo-electric element 1 change.

Figure 4:
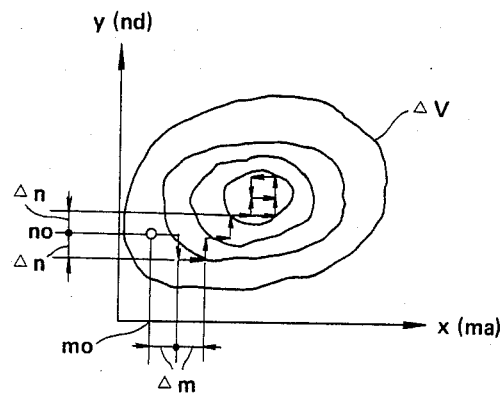
FIGS. 4 and 5 are graphs of the areas of constraint of system parameters.
Figure 5:
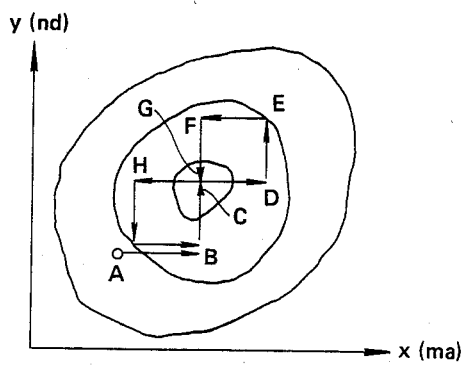

FIG. 4 shows the region to which the factors m and n are constrained, and FIG. 5 is an enlarged view of the center of FIG. 4. In FIGS. 4 and 5, the arrows indicates the directions of constriction of the factors.

Figure 6:
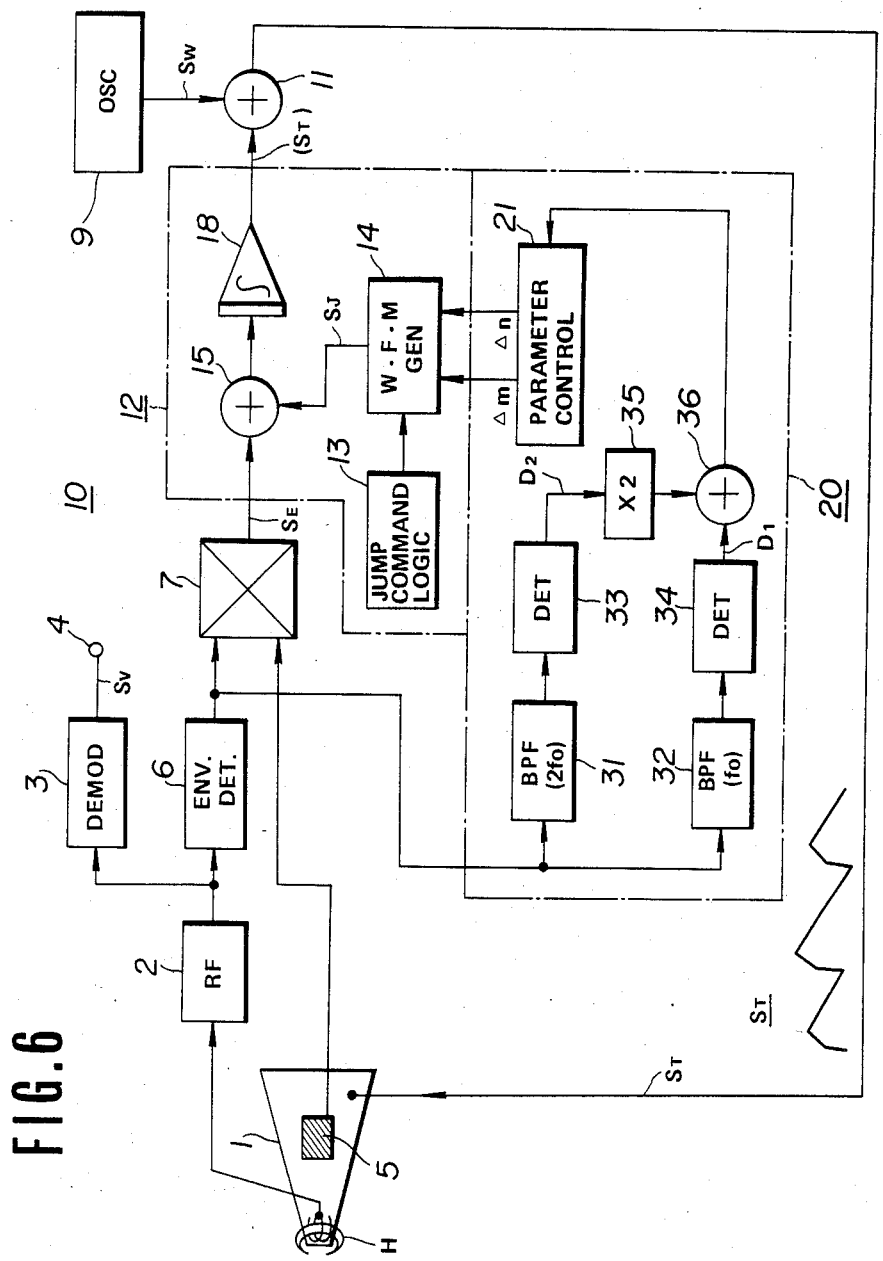
FIG. 6 is a block diagram of a modified form of the control circuit.

Referring to FIG. 6, there is illustrated an modified form of the control circuit 20 of the present invention which employs the ringing frequency component of an envelope signal produced at the output of the envelope detector circuit 6 in determining the waveform of the driving pulse signal. The reference numerals used in FIG. 1 have been applied to FIG. 6 for equivalent components.

The envelope signal includes a ringing frequency component having a frequency of 2f0 when the magnetic head H is under normal-speed conditions, and otherwise, it has a ringing frequency component at a frequency of f0. For this reason, the control circuit 20 includes first and second band pass filter circuits 31 and 32. The first band pass filter circuit 31 has a median band frequency 2f0 and the second band pass filter circuit 32 has a median band frequency f0. The output of the first band pass filter circuit 31 is coupled to a detector circuit 33 which detects the amplitude level of the ringing frequency component. The detected signal D2 is sent through an amplifier circuit 35 to an adder 36. The output of the second band pass filter 32 is coupled to a detector circuit 34 which detects the amplitude level of the ringing frequency component. The detected signal D1 is applied directly to the adder 36. The amplifier circuit 35 is provided to double the amplitude level of the detected signal >1 for the reason that the amplitude level of the ringing frequency component is halved under normal-speed conditions. The output of the adder 36 is coupled to the parameter control circuit 21.

Figure 7:
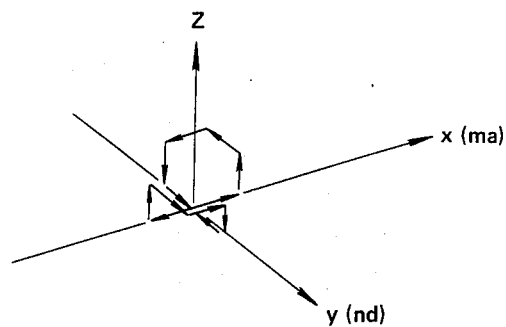
FIG. 7 is a graph of paths of constraints of the parameters used in determining inflection points.

Although, in the above embodiment, the position of a single inflection point is controlled in accordance with the time- and amplitude-related factors m and n, it is to be noted that two or more inflection points may be controlled in accordance with these factors. FIG. 7 illustrates the courses of construction of the parameters in the case where two inflection points are controlled.

Although, in the above embodiment, the jump signal SJ has a bent-line shaped waveform, it is to be noted that the waveform of the jump signal SJ may be in the form of a sine wave having two cycles in each jumping time period, in which case one or more inflection points are controlled in he time- and amplitude-related factors m and n. Although, in the above embodiment, the jumping time period a is fixed, it is to be noted that the jumping time period a may be controlled so as to shift the position of the inflection point along the time axis in accordance with the time-related factor.

It is, therefore, apparent that there has been provided, in accordance with the present invention, an automatic tracking apparatus which allows optimum tracking servo control so as to minimize the ringing level by setting time- and amplitude-related factors m and n in accordance with the ringing frequency component obtaining during a head jumping period and controlling the inflection point of a jump signal SJ based upon the determined factors.

Even if the characteristics of the piezo-electric element 1 change with time and environmental conditions, since the piezo-electric element characteristic changes have a direct influence on the detected amplitude level of the ringing frequency component, the inflection point can be controlled automatically to a desired position.

What is claimed is:

1. An automatic tracking apparatus, for use in a video tape recorder including a magnetic head mounted on a piezo-electric element, comprising:

a drive pulse generator for generating a drive pulse signal which causes the piezo-electric element to deflect and thus drive the magnetic head and the waveform of which includes a jump portion causing the magnetic head to jump from one tape track to another, resulting in ringing vibrations in the piezo-electric element, said pulse generator including means for imposing an inflection point in the jump portion of the drive pulse;

means for detecting the amplitude of ringing vibrations in the piezo-electric element; and means for specifying the position of the inflection point within the jump portion in accordance with the detected amplitude of the ringing vibrations.

2. The automatic tracking apparatus of claim 1, wherein the jump portion has fixed duration and change in amplitude and said inflection point specifying means specifies the duration and change in amplitude of a first part of the jump portion between the start of the jump portion and an inflection point therein in accordance with the detected amplitude of the ringing vibrations.

3. The automatic tracking apparatus of claim 2, wherein said specifying means assigns the duration and the change in amplitude of the first part of the jump portion initial values empirically derived so as to minimize ringing vibrations.

4. The automatic tracking apparatus of claim 3, wherein said specifying means constantly adjusts the values of the duration and the change in amplitude of the first part of the jump portion in accordance with changes in the detected amplitude of the ringing vibrations.

5. The automatic tracking apparatus of claim 1, wherein the amplitude of the ringing vibrations is detected by monitoring the output of the piezo-electric element.

6. The automatic tracking apparatus of claim 1, wherein the amplitude of the ringing vibrations is detected by filtering ringing frequency components out of the video signal from the magnetic head and monitoring their amplitude.

7. In an automatic tracking apparatus, for use in a video tape recorder including a magnetic head mounted on a piezo-electric element, a method for jumping the magnetic head between two tape tracks comprising the steps of:

generating a drive pulse signal which causes the piezo-electric element to deflect and thus drive the magnetic head and the waveform of which includes a jump portion causing the magnetic head to jump from one tape track to another, resulting in ringing vibrations in the piezo-electric element;

imposing an inflection point in the jump portion of the drive pulse;

detecting the amplitude of ringing vibrations in the piezo-electric element; and specifying the position of the inflection point within the jump portion in accordance with the detected amplitude of the ringing vibrations.

8. The method of claim 7, wherein the jump portion has fixed duration and change in amplitude and in said inflection point specifying step, the duration and change in amplitude of a first part of the jump portion between the start of the jump portion and an inflection point therein are specified in accordance with the detected amplitude of the ringing vibrations.

9. The automatic tracking apparatus of claim 8, wherein in said specifying step, the duration and the change in amplitude of the first part of the jump portion are assigned initial values empirically derived so as to minimize ringing vibrations.

10. The automatic tracking apparatus of claim 9, wherein in said specifying step, the values of the duration and the change in amplitude of the first part of the jump portion are continuously updated in accordance with changes in the detected amplitude of the ringing vibrations.

11. The automatic tracking apparatus of claim 7, wherein the amplitude of the ringing vibrations is detected by monitoring the output of the piezo-electric element.

12. The automatic tracking apparatus of claim 7, wherein the amplitude of the ringing vibrations is detected by filtering ringing frequency components out of the video signal from the magnetic head and monitoring their amplitude.

* * * * *